United States Patent [19]
Karasawa

[11] Patent Number: 5,412,559
[45] Date of Patent: May 2, 1995

[54] FULL WAVE RECTIFYING CIRCUIT

[75] Inventor: Kunihiko Karasawa, Itami, Japan

[73] Assignee: Mitsubishi Denki Kabushiki Kaisha, Tokyo, Japan

[21] Appl. No.: 70,290

[22] Filed: Jun. 2, 1993

[30] Foreign Application Priority Data

Jun. 15, 1992 [JP] Japan .................................. 4-155064

[51] Int. Cl.[6] ........................ H02M 7/217; H03K 5/00
[52] U.S. Cl. .................................... 363/127; 363/125; 327/104
[58] Field of Search ................... 363/125, 127; 328/26; 307/260, 261, 262

[56] References Cited

U.S. PATENT DOCUMENTS

| | | | |
|---|---|---|---|
| 4,187,537 | 2/1980 | Avicola et al. | 363/127 |
| 4,523,105 | 6/1985 | Jose et al. | 307/261 |
| 4,724,337 | 2/1988 | Maeda et al. | 307/262 |
| 4,941,080 | 7/1990 | Sieborger | 363/127 |

FOREIGN PATENT DOCUMENTS 3-2676 1/1991 Japan .
3-30828 5/1991 Japan .

*Primary Examiner*—R. Skudy
*Assistant Examiner*—Matthew Nguyen
*Attorney, Agent, or Firm*—Oblon, Spivak, McClelland, Maier & Neustadt

[57] ABSTRACT

The present invention is directed to a full wave rectifying circuit where a single input a.c. signal is used to perform full wave rectification with enhanced accuracy. An a.c. signal is transmitted from an a.c. signal source (1) via a coupling capacitor (3) to bases of transistors (Q1, Q4) of first and second differential gain stages (S1, S2). Outputs from the first and second differential gain stages (S1, S2) are received on input terminals of first and second current mirror circuits (K1, K2). Output currents ($I_{O11}$, $I_{O12}$) from the first and second current mirror circuits (K1, K2) are converted by load resistances working as current-voltage converting means, and then, output voltage $V_{OUT1}$ rectified on the full wave basis is output from an output terminal (12). Portions of the a.c. signal out of phase from each other are rectified on the half wave basis by the first and second differential gain stages (S1, S2) and then they are added, so that a single input a.c. signal can be rectified on the full wave basis, and linearity of an amplitude of an output signal related to an amplitude of an input signal can be improved.

13 Claims, 11 Drawing Sheets (a)
$V_A$   $V_{ref1}$ (b)
$I_{O11}$   0

(c)
$I_{O12}$   0

(d)
$V_{OUT1}$   $V_{CC}$

FIG. 5 (a) $V_A$    $V_{ref2}$
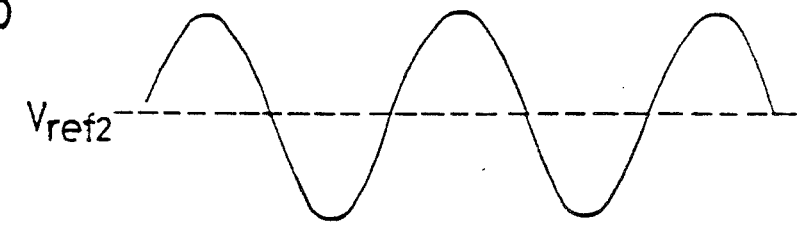
FIG. 5 (b) $I_{O21}$
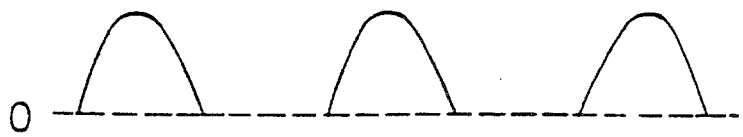
FIG. 5 (c) $I_{O22}$
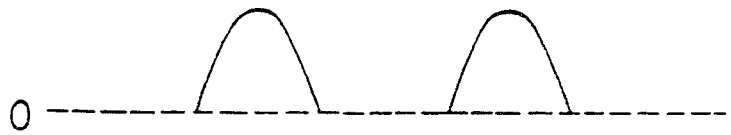
FIG. 5 (d) $V_{OUT2}$
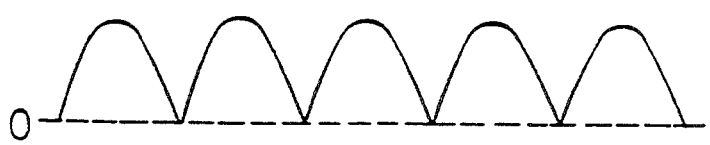

(a)
$V_A$   $V_{ref4}$ (b)
$I_{O11}$   0

(c)
$I_{O12}$   0

(d)   $V_{ref3}$
$V_{OUT3}$

FIG. 9
(PRIOR ART)

FIG. 10
(a) $V_Z$  $V_{ref4}$
(PRIOR ART)

FIG. 10
(b) $V_X$  $V_{ref4}$
(PRIOR ART)

FIG. 10
(c) $V_{ref4}$
$V_Y$
(PRIOR ART)

FIG. 10
(g) $V_{OUT4}$  $V_{S2}$  $A_r$
(PRIOR ART)

FULL WAVE RECTIFYING CIRCUIT

BACKGROUND OF THE INVENTION

1. Field of the Invention

The present invention relates to a full wave rectifying circuit used in a semiconductor integrated circuit or the like, and more particularly, it relates to a full wave rectifying circuit of improved accuracy where single input is rectified on the full wave basis.

2. Description of the Prior Art

A prior art full wave rectifying circuit will be described with reference to FIG. 9. FIG. 9 is a circuit diagram showing the prior art full wave rectifying circuit. The full wave rectifying circuit in FIG. 9 includes an a.c. signal source 50, a d.c. voltage source 51 outputting voltage $V_{ref4}$, a coupling capacitor 52, differential twin transistors Q63, Q64, resistances 53, 54, 56, 57, 58, 59, and a constant current source 55 supplying constant current $I_7$. The resistances 53, 54, 57, 58, 59, the constant current source 55 and the transistors Q63, Q64 together constitute a single-input differential output converting circuit. Single input is converted by the single-input differential output converting circuit into a differential output and then output from an output terminal connected to collectors of the transistors Q63, Q64. The full wave rectifying circuit further includes coupling capacitors 60, 61, differential twin transistors Q60, Q61, resistances 62, 63 connected to the d.c. voltage source 51 for supplying d.c. voltage $V_{ref4}$ to bases of the transistors Q60, Q61, a resistance 65 grounding emitters of the differential twin transistors Q60, Q61, a resistance 64 connecting collectors of the differential twin transistors Q60, Q61 to a voltage terminal 67, an output transistor Q62 having its base connected to the collectors of the differential twin transistors Q60, Q61, and a constant current source 66 connected to an emitter of the output transistor Q62 for supplying constant current $I_8$.

Then, an operation of the full wave rectifying circuit shown in FIG. 9 will be described. FIGS. 10(a) to 10(g) are diagrams illustrating signal waveforms at various junctions of the full wave rectifying circuit shown in FIG. 9. An a.c. signal is transmitted from the a.c. signal source 50 to a junction Z marked in FIG. 9, or a base of the transistor Q63, via the coupling capacitor 52. The voltage $V_{ref4}$ is applied to bases of the transistors Q63, Q64 by the d.c. voltage source 51. The a.c. signal input to the junction Z is converted into a differential output by the differential twin transistors Q63, Q64 and then input via the coupling capacitors 60, 61 to junctions X and Y, respectively. The voltage $V_{ref4}$ is applied via the resistances 62, 63 to the junctions X and Y by the d.c. voltage source 51. Voltage waveforms at the junctions X and Y are waveforms of voltage $V_x$ and voltage $V_y$ shown in FIGS. 10(b) and 10(c). As shown in these figures, the waveforms of the voltages $V_x$, $V_y$ are waveforms opposite in phase to each other.

When the voltage $V_x$ at the junction X and the voltage $V_y$ at the junction Y satisfy the relation of $V_x > V_y$, that is, in the event of a first semicycle, the transistor Q60 turns on while the transistor Q61 turns off. Assuming now that resistance values of the resistances 64, 65 are $R_{64}$, $R_{65}$, values of currents flowing in the resistances 64, 65, respectively, are $I_{R64}$, $I_{R65}$, and base-emitter voltage of the transistor Q60 is $V_{BE1}$, the currents $I_{R64}$, $I_{R65}$ are expressed by the following formula:

$$I_{R64} \approx I_{R65} = \frac{V_X - V_{BE1}}{R_{65}} \quad (1)$$

Assuming that supply voltage of the circuit shown in FIG. 9 is $V_{CC}$, output voltage is $V_{OUT4}$, and voltage at a junction U is $V_U$, $V_U$ and $V_{OUT4}$ are given by the following formulas:

$$V_U = V_{CC} - I_{R64} \cdot R_{64} = V_{CC} - \frac{R_{64}}{R_{65}} (V_X - V_{BE1}) \quad (2)$$

$$V_{OUT4} = V_U - V_{BE3} = V_{CC} - \frac{R_{64}}{R_{65}} (V_X - V_{BE1}) - V_{BE3} \quad (3)$$

When the voltage $V_x$ at the junction X and the voltage $V_y$ at the junction Y satisfy the relation of $V_x < V_y$, or in the event of the first semicycle, the transistor Q60 turns off while the transistor Q61 turns on. In this situation, assuming that the base-emitter voltage of the transistor Q61 is $V_{BE2}$, the currents $I_{R64}$, $I_{R65}$ flowing in the resistances 64, 65 are given by the following formula:

$$I_{R64} \approx I_{R65} = \frac{V_Y - V_{BE2}}{R_{65}} \quad (4)$$

Furthermore, the voltage $V_U$ at the junction U and the output voltage $V_{OUT4}$ are given by the following formulas:

$$V_U = V_{CC} - I_{R64} \cdot R_{64} = V_{CC} - \frac{R_{64}}{R_{65}} (V_Y - V_{BE2}) \quad (5)$$

$$V_{OUT4} = V_U - V_{BE3} = V_{CC} - \frac{R_{64}}{R_{65}} (V_Y - V_{BE2}) - V_{BE3} \quad (6)$$

Thus, the output voltage $V_{OUT4}$ exhibits a waveform rectified on the full wave basis as illustrated in FIG. 10(g). The currents $I_{R64}$, $I_{R65}$ and the voltage $V_U$ exhibit waveforms with a criterion of the current or voltage expressed in the following formula, as illustrated in FIGS. 10(c), 10(d) and 10(e):

$$I_S = (V_{ref4} - V_{BE1})/R_{65} \quad (7)$$

$$V_{S1} = V_{CC} - \frac{R_{64}}{R_{65}} (V_{ref4} - V_{BE1})$$

$$V_{S2} = V_{CC} - \frac{R_{64}}{R_{65}} (V_{ref4} - V_{BE1}) - V_{BE3}$$

In the course of a transition from a condition $V_x > V_y$ to another condition $V_x < V_y$ as to the voltages $V_x$ and $V_y$, that is, in the course of a transition from a condition that the transistor Q60 is in its ON-state while the transistor Q61 is in its OFF-state to another condition that the transistor Q60 is in its OFF-state while the transistor Q61 is in its ON-state, there exists a state where both the transistors Q60 and Q61 are in ON-state. Under the condition that both the transistors Q60 and Q61 are in ON-state, the currents $I_{R64}$, $I_{R65}$ branch into both the transistors Q60, Q61. It is apparent that the base-emitter voltage $V_{BE1}$ or $V_{BE2}$ under this condition is different in level from the voltage $V_{BE1}$ or $V_{BE2}$ under a condition that all of the currents $I_{R64}$ and $I_{R65}$ flow in either the transistor Q60 or the transistor Q61. Variations in the voltage $V_{BE1}$ or $V_{BE2}$ is a factor of an error caused in the output voltage $V_{OUT4}$ as will be recognized in the formulas (3) and (6), and as the input a.c. signal is decreased, a rate of the error is increased. FIG. 11 is an enlarged diagram of a portion Ar encircled by broken line in the output voltage $V_{OUT4}$ illustrated in FIG. 10(g). As shown in FIG. 11, the waveform may be made blunt in a region where the output voltage $V_{OUT4}$ related to small input voltage $V_{IN}$ becomes small. In FIG. 11, although an ideal waveform of the output is drawn by broken line, the output practically exhibits a waveform as drawn by solid line. FIG. 12 shows an input/output characteristic of the full wave rectifying circuit shown in FIG. 9. In the full wave rectifying circuit shown in FIG. 9, linearity of the input/output characteristic is detracted for the above-mentioned reasons.

The prior art full wave rectifying circuit is configured as discussed above, and therefore, there are disadvantages that it requires a single-input differential output converting circuit for converting a single input into a differential output so as to rectify the single input on the full wave basis and besides that the linearity of the output voltage $V_{OUT4}$ rectified on the full wave basis is detracted in a region where input voltage is small because of variations in the base-emitter voltages $V_{BE1}$ and $V_{BE2}$.

SUMMARY OF THE INVENTION

According to the present invention, a full wave rectifying circuit comprises signal applying means having a first output terminal for applying d.c. bias voltage and a second output terminal for applying an a.c. signal with a reference of the d.c. bias voltage; a first differential gain stage having a positive phase input terminal connected to the first output terminal of the signal applying means, a negative phase input terminal connected to the second output terminal of the signal applying means, and an output terminal, for rectifying the a.c. signal on the half wave basis to output it from the output terminal; a second differential gain stage having a negative phase input terminal connected to the first output terminal of the signal applying means, a positive phase input terminal connected to the second output terminal of the signal applying means, and an output terminal, for rectifying the a.c. signal on the half wave basis to output it from the output terminal; and an output circuit connected to the output terminals of the first and second differential gain stages for synthesizing output from the first and second differential gain stages.

Preferably, the first differential gain stage includes a first differential element having a power terminal connected to a first d.c. current source for supplying specified current, a first voltage input terminal for receiving the d.c. bias voltage from the positive phase input terminal of first differential gain stage, a second voltage input terminal for receiving the a.c. signal from the negative phase input terminal of the first differential gain stage, and first and second current output terminals for outputting the specified current received from the power terminal, the specified current being branched depending upon a potential difference between the first and second voltage input terminals so as to output them from the first and second current output terminals, and a first active load having first and second current input terminals connected to the first and second current output terminals of the first differential element, and a current output terminal for producing output current in accordance with a difference between currents received from the first and second current input terminals of the first active load, and the second differential gain stage includes a second differential element having a power terminal connected to a second d.c. current source for supplying specified current, a first voltage input terminal for receiving the d.c. bias voltage from the positive phase input terminal of the second differential gain stage, a second voltage input terminal for receiving the a.c. signal from the negative phase input terminal of the second differential gain stage, and first and second current output terminals for outputting the specified current received from the power terminal of the second differential element, the specified current being branched depending upon a potential difference between the first and second voltage input terminals of the second differential element so as to output them from the first and second current output terminals of the second differential element, and a second active load having first and second current input terminals connected to the first and second current output terminals of the second differential element, and a current output terminal for outputting output current produced in accordance with a difference between currents received from the first and second current input terminals of the second active load.

Preferably, the first differential element includes a first transistor having its control electrode connected to the first voltage input terminal of the first differential element and its first electrode connected to the first current output terminal of the first differential element, a second transistor having its control electrode connected to the second voltage input terminal of the first differential element and its first electrode connected to the first current output terminal of the first differential element, a first resistance having its first terminal connected to a second electrode of the first transistor and its second terminal connected to the power terminal of the first differential element, and a second resistance having its first terminal connected to a second electrode of the second transistor and its second terminal connected to the power terminal of the first differential element, and the second differential element includes a third transistor having its control electrode connected to the first voltage input terminal of the second differential element and its first electrode connected to the first current output terminal of the second differential element, a fourth transistor having its control electrode connected to the second voltage input terminal of the second differential element and its first electrode connected to the first current output terminal of the second differential element, a third resistance having its first terminal connected to a second electrode of the third transistor and its second terminal connected to the power terminal of the second differential element, and a fourth resistance having its first terminal connected to a second electrode of the fourth transistor and its second terminal connected to the power terminal of the second differential element.

Preferably, the first active lead includes a fifth transistor having its first electrode and control electrode connected to the first current input terminal of the first active lead and its second electrode connected to a reference potential, and a sixth transistor having its first electrode connected to the second current input terminal of the first active lead, its control electrode connected to the control electrode of the fifth transistor, and its second electrode connected to the reference potential, and the second active lead includes a seventh transistor having its first electrode and control electrode connected to the first current input terminal of the second active lead and its second electrode connected to a reference potential, and a eighth transistor having its first electrode connected to the second current input terminal of the second active lead, its control electrode connected to the control electrode of the second transistor, and its second electrode connected to the reference potential.

Preferably, the output circuit includes a first current mirror circuit having an input terminal connected to the output terminal of the first differential gain stage and an output terminal, a second current mirror circuit having an input terminal connected to the output terminal of the second differential gain stage and an output terminal, and current-voltage converting means connected to the output terminals of the first and second current mirror circuits for converting currents received from the first and second current mirror circuits into voltage to output it.

Preferably, the first current mirror circuit includes a first transistor having its first electrode and control electrode connected to the input terminal of the first current mirror circuit and its second electrode connected to a reference potential, and a second transistor having its control electrode connected to the control electrode of the first transistor and its second electrode connected to the reference potential, and the second current mirror circuit includes a third transistor having its first electrode and control electrode connected to the input terminal of the second current mirror circuit and its second electrode connected to the reference potential, and a fourth transistor having its control electrode to the control electrode of the third transistor and its second electrode to the reference potential.

Preferably, the current-voltage converting means includes voltage dropping means having its first terminal connected to the output terminals of the first and second current mirror circuits and its second terminal connected to a first potential different from the reference potential.

Preferably, the current-voltage converting means includes an operational amplifier having an inverting input terminal connected to the output terminals of the first and second current mirror circuits, a non-inverting input terminal, and an output terminal, a reference voltage source having its first electrode connected to the non-inverting input terminal of the operational amplifier and its second electrode connected to the reference potential, and voltage dropping means having its first terminal connected to the output terminal of the operational amplifier and its second terminal connected to the inverting input terminal of the operational amplifier.

Preferably, the reference voltage source includes output voltage variable reference voltage source capable of varying voltage applied between the first and second electrodes provided in itself.

Preferably, the voltage dropping means includes a resistance having its first terminal connected to the output terminal of the operational amplifier and its second terminal connected to the inverting input terminal of the operational amplifier.

Preferably, the signal applying means includes a first buffer circuit for buffering the d.c. bias voltage to output it from the first output terminal, and a second buffer circuit for buffering the a.c. signal with a reference of the d.c. bias voltage to output it from the second output terminal.

Preferably, the signal applying means further includes a constant voltage source having its first electrode connected to a reference potential, and first voltage dropping means having its first terminal connected to a second electrode of the constant voltage source and its second terminal connected to the first buffer circuit.

Preferably, the first buffer circuit includes a first transistor having its control electrode connected to the second terminal of the first voltage dropping means, its first electrode connected to the reference potential, and its second electrode connected to the first output terminal of the first buffer circuit, for receiving specified current on the second electrode.

Preferably, the signal applying means further includes an a.c. signal input terminal for receiving the a.c. signal, a capacitor having its first terminal connected to the a.c. signal input terminal, and second voltage dropping means having its first terminal connected to the second electrode of the constant voltage source and its second terminal connected to a second terminal of the capacitor and the second buffer circuit.

Preferably, the second buffer circuit includes a second transistor having its control electrode connected to the second terminal of the second voltage dropping means, its first electrode connected to the reference potential, and its second electrode connected to the second output terminal of the second buffer circuit, for receiving specified current on the second electrode.

In an aspect of the present invention, a full wave rectifying circuit includes a first differential gain stage which has a positive phase input terminal connected to a first output terminal of signal applying means, a negative phase input terminal connected to a second output terminal of the signal applying means, and an output terminal, for rectifying an a.c. signal on the half wave basis to output it from the output terminal; a second differential gain stage which has a negative phase input terminal connected to the first output terminal of the signal applying means, a positive phase input terminal connected to the second output terminal of the signal applying means, and an output terminal, for rectifying an a.c. signal on the half wave basis to output it from the output terminal; and an output circuit connected to the output terminals of the first and second differential gain stages for synthesizing outputs from the first and second differential gain stages; and currents output from the first and second differential gain stages exhibit waveforms where portions of the input a.c. signals out of phase from each other are rectified on the half wave basis. The output circuit synthesizes the currents output from the first and second differential gain stages so that the input a.c. signals are rectified on the full wave basis, and eventually, a full wave rectified signal can be output from the output terminal, the a.c. signals can be input as a single signal, linearity of output voltage related to input voltage can be improved to enhance an accuracy.

In another aspect of the present invention, a full wave rectifying circuit includes an output circuit which has a first current mirror circuit having an input terminal connected to an output terminal of a first differential gain stage and an output terminal, a second current mirror circuit having an input terminal connected to an output terminal of a second differential gain stage and an output terminal, and current-voltage converting means connected to the output terminals of the first and second current mirror circuits for converting currents supplied from the first and second current mirror circuits into voltage to output it; and eventually, the currents rectified by the first and second differential gain stages can be output as the full wave rectified voltage from the current-voltage converting means.

In still another aspect of the present invention, a full wave rectifying circuit includes current-voltage converting means which has an reference voltage source having a inverting input terminal connected to output terminals of first and second current mirror circuits, a non-inverting input terminal, an operational amplifier having an output terminal, a first electrode connected to the non-inverting input terminal of the operational amplifier, and a second electrode connected to a reference potential; and voltage dropping means having a first terminal connected to the output terminal of the operational amplifier and a second terminal connected to the inverting input terminal of the operational amplifier; and eventually, varying voltage at the reference voltage source, a reference of output voltage can be freely set.

In further another aspect of the present invention, a full wave rectifying circuit includes signal applying means which has a first buffer circuit for buffering d.c. bias voltage to output it from a first output terminal, and a second buffer circuit for buffering an a.c. signal to output it from a second output terminal; and eventually, variations in the d.c. bias voltage caused by input characteristics of first and second differential gain stages can be prevented to enhance an accuracy of resultant full wave rectified output.

Accordingly, it is an object of the present invention to provide a full wave rectifying circuit with high accuracy where an a.c. signal can be received as a single input.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 5(a)-5(d) are signal waveform diagrams illustrating each component of the full wave rectifying circuit shown in FIG. 4;

Figure 9:
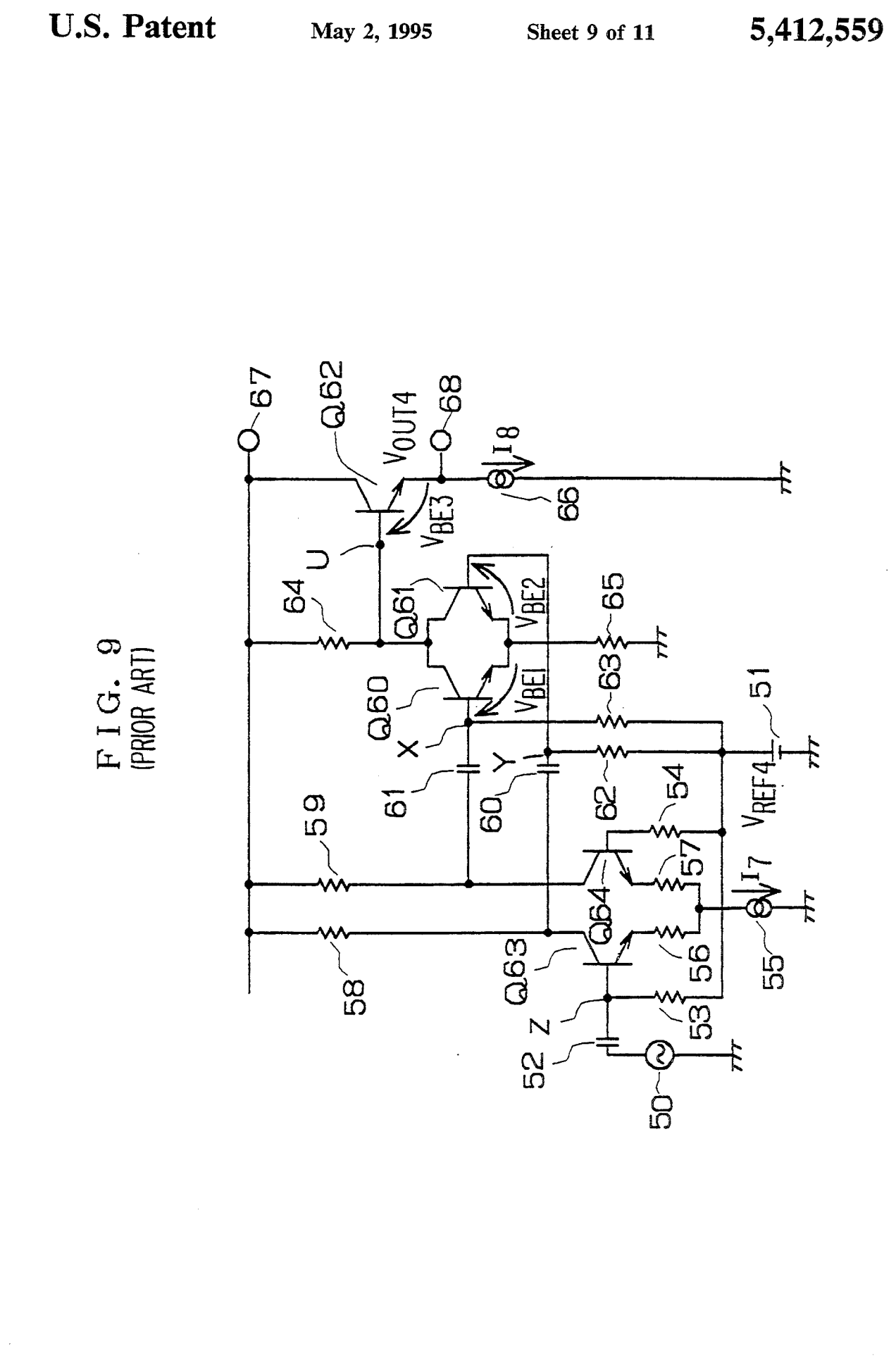

FIG. 9 is a circuit diagram showing a structure of a prior art full wave rectifying circuit;

FIGS. 10(a)-10(g) are circuit diagrams showing a structure of the prior art rectifying circuit shown in FIG. 9;

DETAILED DESCRIPTION OF THE PREFERRED EMBODIMENT

Figure 1:
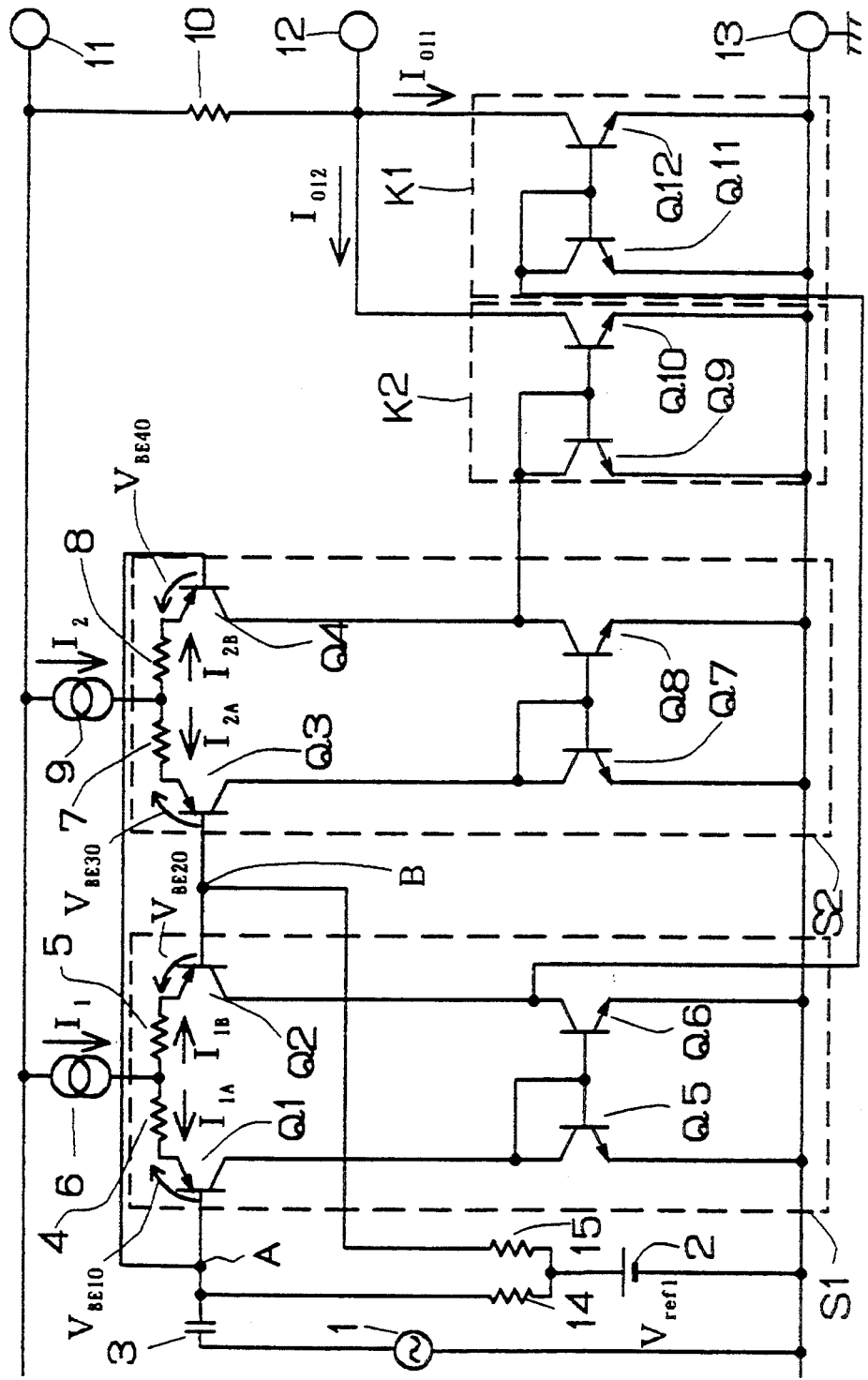
FIG. 1 is a circuit diagram showing a structure of a full wave rectifying circuit of a first preferred embodiment according to the present invention.
Figure 2:
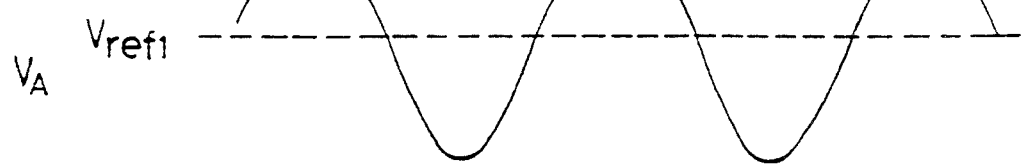
FIGS. 2(a)-2(d) are signal waveform diagrams illustrating an operation of each component of the full wave rectifying circuit shown in FIG. 1.
Figure 2:
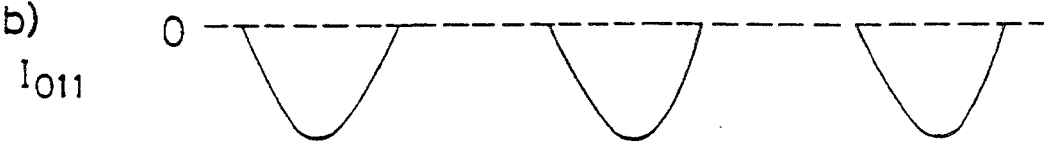
Figure 2:
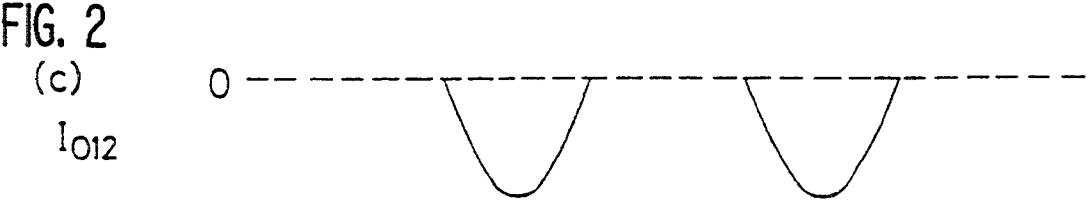
Figure 2:
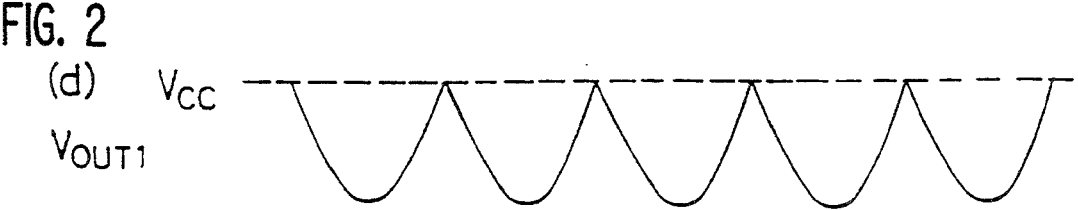
Figure 3:
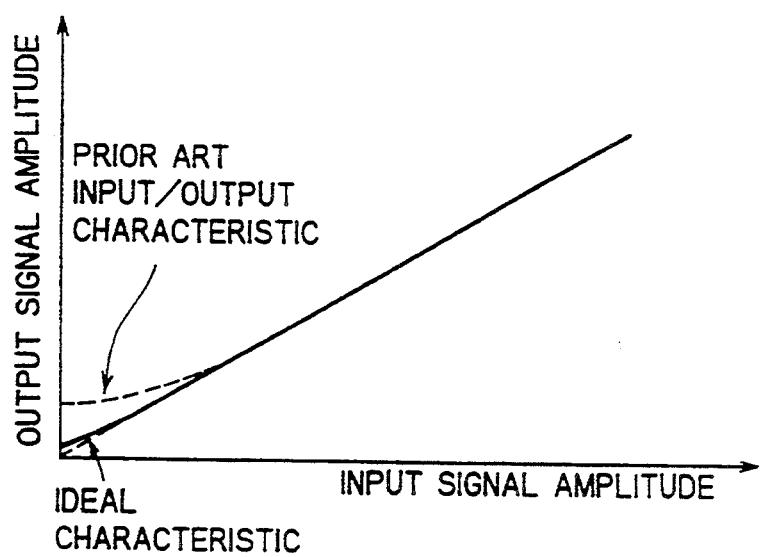
FIG. 3 is a diagram illustrating an input/output characteristic of the full wave rectifying circuit shown in FIG. 1.

A first preferred embodiment of the present invention will be described below in conjunction with FIG. 1 through FIG. 3. FIG. 1 is a circuit diagram showing a full wave rectifying circuit of the first preferred embodiment according to the present invention. In FIG. 1, the full wave rectifying circuit includes an a.c. signal source 1, a d.c. voltage source 2 for applying voltage $V_{ref1}$, a coupling capacitor 3, transistors Q1, Q2 receiving a signal from the a.c. signal source 1 and the d.c. voltage $V_{ref1}$ to cooperatively work as a first differential gain stage S1, transistors Q5, Q6 for active load of the first differential gain stage S1, resistances 4, 5 setting a gain of the first differential gain stage S1, constant current source 6 supplying current $I_1$ to the first differential gain stage S1, transistors Q3, Q4 receiving a signal from the a.c. signal source 1 and the d.c. voltage $V_{ref1}$ to cooperatively work as a second differential gain stage S2, transistors Q7, Q8 for an active load of the second differential gain stage S2, resistances 7, 8 setting a gain of the second differential gain stage S2, and a constant current source 9 supplying current $I_2$ to the second differential gain stage S2. The full wave rectifying circuit further includes transistors Q11, Q12 cooperatively work as a first current mirror circuit K1. Inputs of the first current mirror circuit K1, or bases of the transistors Q11, Q12, are connected to an output of the first differential gain stage S1. Q9, Q10 are transistors cooperatively working as a second current mirror circuit K2. Inputs of the second current mirror circuit K2, or bases of the transistors Q9, Q10, are connected to an output of the second differential gain stage S2. Reference numeral 10 denotes a load resistance, numeral 11 denotes a power terminal connected to a power source applying supply voltage $V_{CC}$, and numeral 12 denotes an output terminal. A terminal 13 is grounded. The load resistance 10 has its first terminal connected to outputs of the first and second current mirror circuits K1, K2 and its second terminal connected to the power terminal 11. Reference numerals 14, 15 denote resistances for supplying the d.c. voltage $V_{ref1}$ to bases of the transistors Q1, Q2, and Q3, Q4 of the first and second differential gain stages S1, S2.

Then, an operation of the full wave rectifying circuit shown in FIG. 1 will be described in conjunction with FIGS. 2 and 3. FIG. 2 is a waveform diagram illustrating a signal waveform at each junction of the full wave rectifying circuit shown in FIG. 1. Herein, for simplifying the description, influence of base current in each transistor is ignored. It is also assumed that the resistances 4, 5, 7, and 8 have an identical resistance value R. An a.c. signal is transmitted from the a.c. signal source 1 via the coupling capacitor 3 to a junction A of the full wave rectifying circuit, and the voltage $V_{ref1}$ is applied thereto by the d.c. voltage source 2. Assuming that the voltage at the junction A is $V_A$, the voltage $V_A$ exhibits a waveform as illustrated in FIG. 2(a). The voltage $V_{ref1}$ is also applied to a junction B by the d.c. voltage source 2, and assuming now that the voltage at the junction B is $V_B$, $V_B=V_{ref1}$.

When the voltage $V_A$ is higher than the voltage $V_B$ (in the first semicycle), output current $I_{011}$ from the first current mirror circuit K1 is given by the following formula, where currents flowing in the resistances 4 and 5 are $I_{1A}$, $I_{1B}$ and $I_1=I_{1A}+I_{1B}$:

$$I_{011}=I_{1B}-I_{1A} \qquad (8)$$

Also assuming that base-emitter voltages of the transistors Q1, Q2 are $V_{BE10}$ and $V_{BE20}$, the first differential gain stage should hold the relation expressed by the following formula:

$$V_A+V_{BE10}+R \cdot I_{1A}=V_B+V_{BE20}+R \cdot I_{1B} \qquad (9)$$

The formulas 8 and 9 are rearranged into the following formula:

$$I_{011} = \frac{(V_A - V_B) + (V_{BE10} - V_{BE20})}{R} \qquad (10)$$

The voltage $V_A$ is applied to the base of the transistor Q3 and the voltage $V_B$ is applied to the base of the transistor Q4 in the second differential gain stage S2 so as to be symmetrical in connection to the first differential gain stage S1, and inputs of the second differential gain stage S2 are opposite in phase to those of the first differential gain stage S1. Thus, output current $I_{012}$ from the second current mirror circuit K1 is identical in magnitude and reverse in direction to output current $I_{011}$, but since there is no means for supplying current to an output of the second differential gain stage S2, the transistor Q8 is saturated. Thus, the transistors Q9, Q10 cooperatively working as the second current mirror circuit K2 turn off. Consequently, the output current $I_{012}=0$.

When the voltage $V_B$ is higher than the voltage $V_A$ (in the subsequent semicycle), the output current $I_{012}$ from the first current mirror circuit K1 is given by the following formula, where currents flowing in the resistances 7, 8 are $I_{2A}$, $I_{2B}$ and $I_2=I_{2A}+I_{2B}$:

$$I_{012}=I_{2A}-I_{2B} \qquad (11)$$

Assuming that base-emitter voltages of the transistors Q3, Q4 are $V_{BE30}$, $V_{BE40}$, the first differential gain stage S1 should hold the relation expressed by the following formula:

$$V_A+V_{BE40}+R \cdot I_{2A}=V_B+V_{BE30}+R \cdot I_{2B} \qquad (12)$$

Then, the formulas 11 and 12 are rearranged as follows:

$$I_{012} = \frac{(V_B - V_A) + (V_{BE30} - V_{BE40})}{R} \qquad (13)$$

The input voltages $V_A$, $V_B$ are applied to the bases of the transistors Q3, Q4 in the second differential gain stage S2 so as to be opposite in phase to the inputs of the first differential gain stage S1. Thus, as to the output current $I_{011}$ from the first current mirror circuit K1, $I_{011}=0$ for the same reason with the output current $I_{012}$ in the first semicycle.

The output currents $I_{011}$ and $I_{012}$ are current-voltage converted by the load resistance 10. Then, resultant output voltage $V_{OUT1}$ is given by the following formula:

$$\begin{aligned} V_{OUT1} &= I_{011} \times R_5 \\ &= \{(V_A - V_B) + (V_{BE10} - V_{BE20})\} \frac{R_5}{R} \\ & (V_A > V_B) \end{aligned} \qquad (14)$$

$$\begin{aligned} V_{OUT1} &= I_{012} \times R_5 \\ &= \{(V_B - V_A) + (V_{BE30} - V_{BE40})\} \frac{R_5}{R} \\ & (V_A < V_B) \end{aligned}$$

Thus, the output voltage $V_{OUT1}$ exhibits a full wave rectified waveform as illustrated in FIG. 2(d). Waveforms of the output currents Ion, $I_{011}$, $I_{012}$ are shown in FIGS. 2(b) and 2(c), respectively.

In the full wave rectifying circuit shown in FIG. 1, as will be recognized in the formulas 10 and 13, when ($V_{BE10}-V_{BE20}$) and ($V_{BE30}-V_{BE40}$) are not zero, voltages equivalent to the differences will be factors of an error caused in the output voltage $V_{OUT1}$. Thus, an arrangement must be made to make the difference voltages ($V_{BE10}-V_{BE20}$) and ($V_{BE30}-V_{BE40}$) as small as possible. For example, the difference between the current $I_{1A}$ and the current $I_{1B}$ and the difference between the current $I_{2A}$ and the current $I_{2B}$ when an a.c. signal is received from the a.c. signal source 1 must be made small. Making the current $I_1$ and the resistance value R of the resistances 4, 5, 7 and 8 sufficiently large, disadvantages as stated above can be overcome. FIG. 3 shows an input/output characteristic of the full wave rectifying circuit according to the first preferred embodiment of the present invention. Even if an amplitude of the a.c. signal input thereto is reduced, linearity is less detracted compared with an input/output characteristic in the prior art embodiment where variations in base-emitter voltages $V_{BE1}$, $V_{BE2}$ directly lead to errors.

Figure 4:
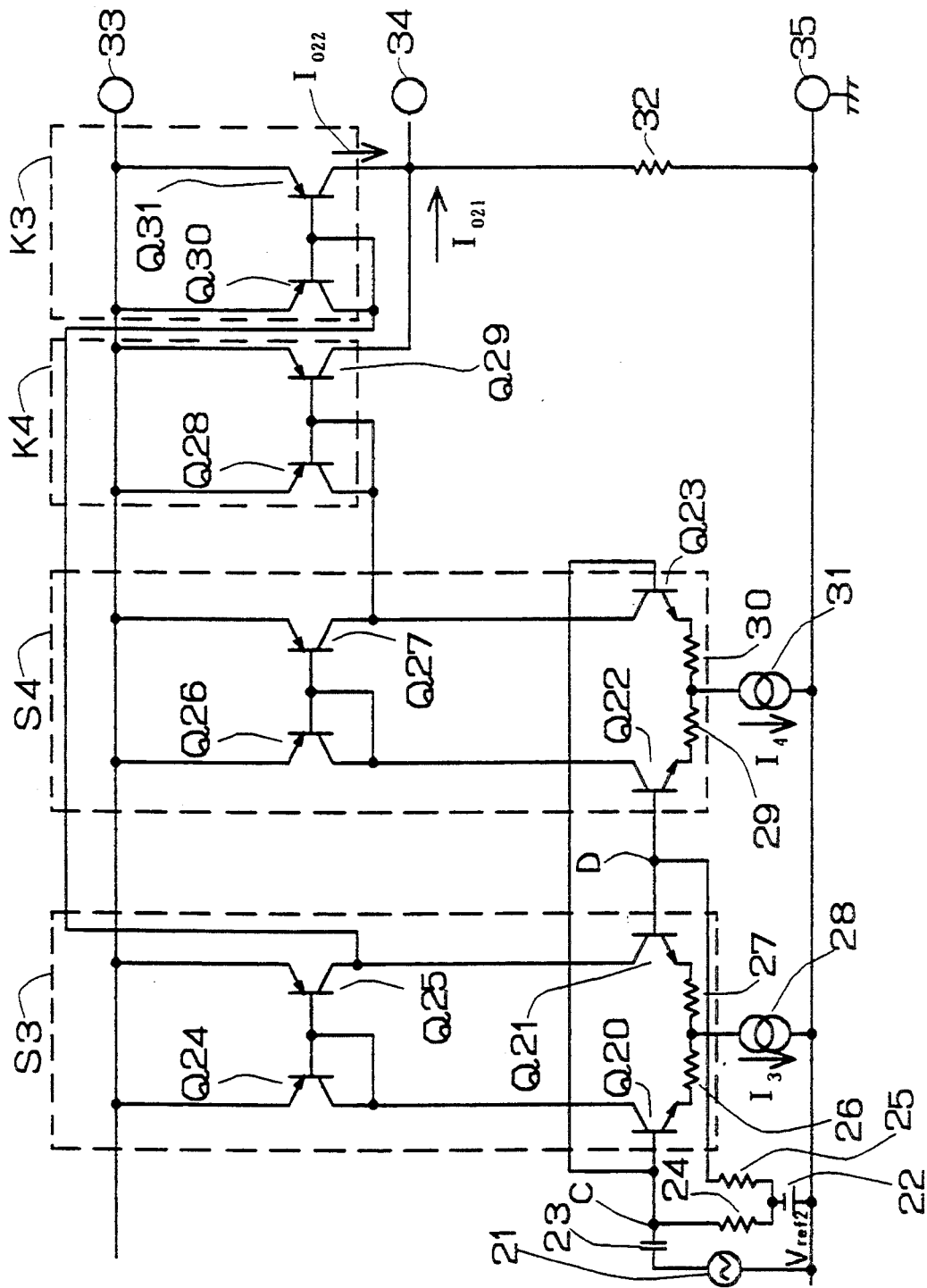
FIG. 4 is a circuit diagram showing a structure of a full wave rectifying circuit of a second preferred embodiment according to the present invention.

A second preferred embodiment of the present invention will now be described in conjunction with FIGS. 4 and 5. FIG. 4 is a circuit diagram showing a structure of a full wave rectifying circuit of the second preferred embodiment according to the present invention. In FIG. 4, the full wave rectifying circuit includes an a.c. signal source 21, a d.c. voltage source 22 for applying voltage $V_{ref2}$, a coupling capacitor 23, transistors Q20, Q21 receiving a signal from the a.c. signal source 21 and the voltage $V_{ref2}$ to cooperatively work as a first differential gain stage S3, transistors Q24, Q25 for active load of the first differential gain stage S3, resistances 26, 27 setting a gain of the first differential gain stage S3, a constant current source 28 supplying current $I_3$ to the first differential gain stage S3, transistors Q22, Q23 receiving a signal from the a.c. signal source 21 and the voltage $V_{ref2}$ to cooperatively work as a second differential gain stage S4, transistors Q26, Q27 for an active load of the second differential gain stage S4, resistances 29, 30 setting a gain of the second differential gain stage S4, and a constant current source 9 supplying current $I_4$ to the second differential gain stage S4. The full wave rectifying circuit further includes transistors Q30, Q31 constituting a first current mirror circuit K3. Inputs of the first current mirror circuit K3, or bases of the transistors Q30, Q31 are connected to an output of the first differential gain stage S3. Q28, Q29 are transistors constituting a current mirror circuit K4. Inputs of the second current mirror circuit K4, or bases of the transistors Q28, Q29, are connected to an output of the second differential gain stage S4. Reference numeral 32 denotes a load resistance, numeral 33 denotes a power terminal connected to a power source applying supply voltage $V_{CC}$, and numeral 34 denotes an output terminal. A terminal 35 is grounded. The load resistance 32 has its first terminal connected to outputs of the first and second current mirror circuits K1, K2, and its second terminal connected to the power terminal 31. Reference numerals 24, 25 denote resistances for supplying the d.c. voltage $V_{ref2}$ to bases of the transistors Q30, Q31, and Q32, Q33 of the first and second differential gain stages S3, S4.

The full wave rectifying circuit according to the second preferred embodiment shown in FIG. 4 utilizes transistors reverse in conductivity type to that employed in the full wave rectifying circuit according to the first preferred embodiment shown in FIG. 1 and includes the differential gain stages and the current mirror circuits comprised of PNP transistors, so that it can produces full wave rectified voltage in accordance with a reference of voltage GND. An operation of the full wave rectifying circuit of the second preferred embodiment is similar to that of the first preferred embodiment shown in FIG. 1 although directions of currents and voltages are different. FIG. 5 is a waveform diagram illustrating a signal waveform at each junction of the full wave rectifying circuit of FIG. 4. FIG. 5(a) shows a waveform at a junction C receiving a signal from the a.c. signal source 21 via the capacitor 23. FIGS. 5(b) and 5(c) depicts waveforms of output currents $I_{O21}$, $I_{O22}$ of the first and second current mirror circuits K3, K4. FIG. 5(d) depicts a waveform of the output voltage $V_{OUT2}$.

Figure 6:
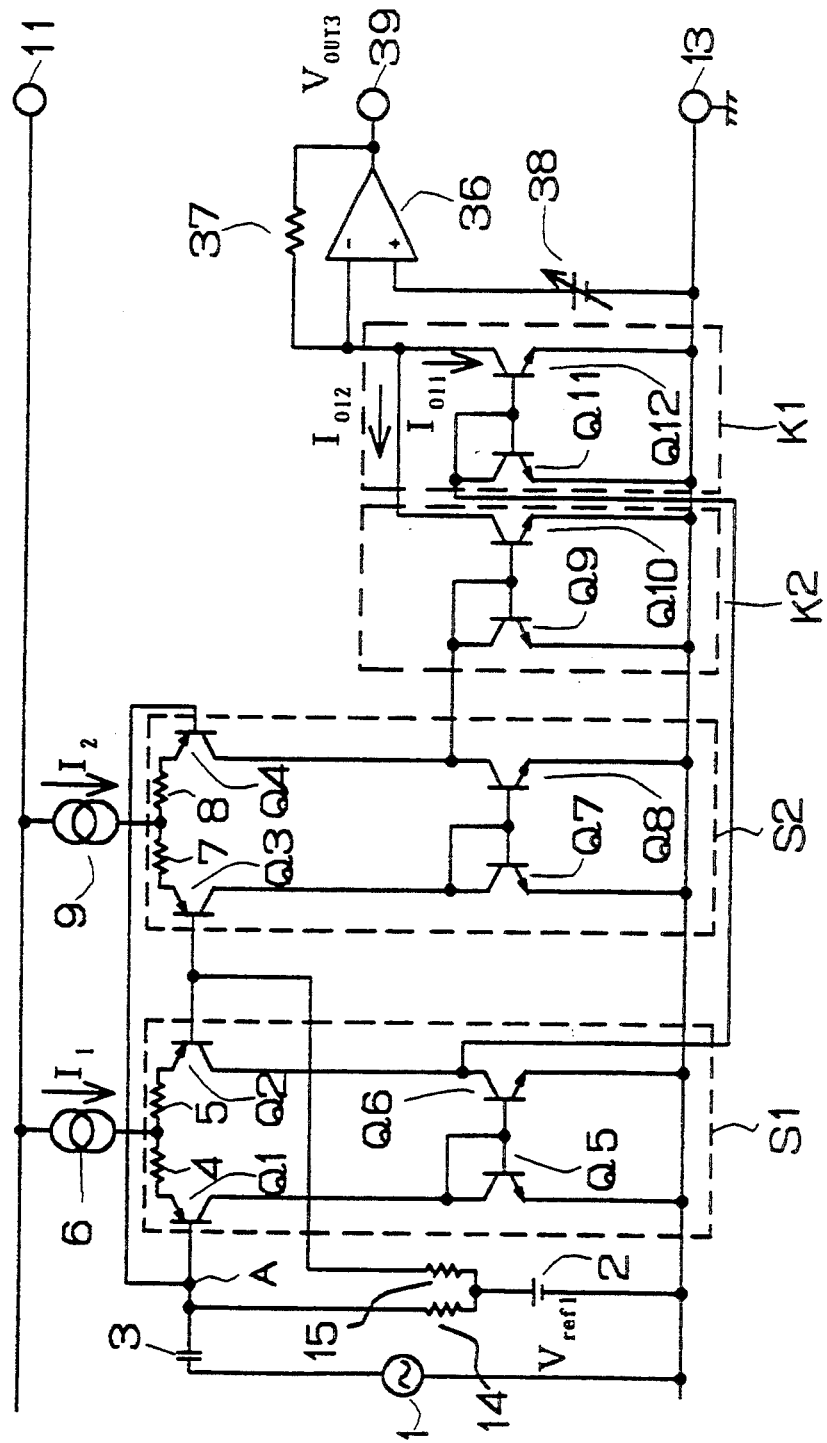
FIG. 6 is a circuit diagram showing a structure of a full wave rectifying circuit of a third preferred embodiment according to the present invention.
Figure 7:
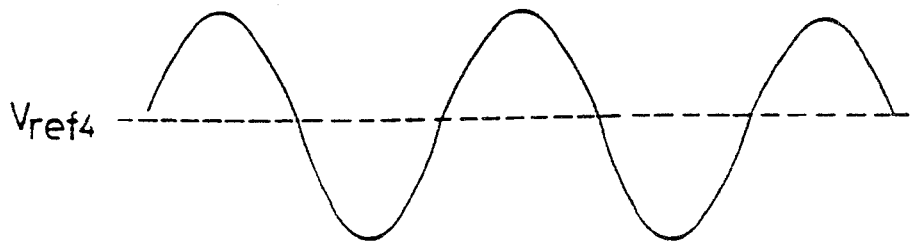
FIGS. 7(a)-7(d) are signal waveform diagrams illustrating an operation of each component of the full wave rectifying circuit shown in FIG. 6.
Figure 7:
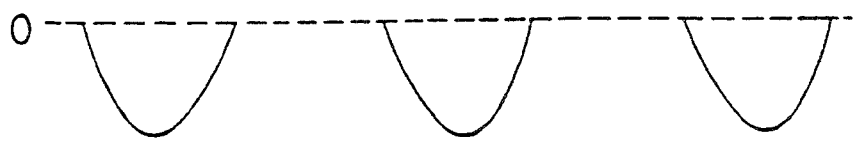
Figure 7:
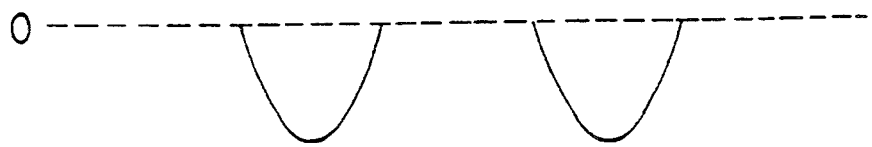
Figure 7:

Then, a third preferred embodiment of the present invention will be described in conjunction with FIG. 6. In FIG. 6, a full wave rectifying circuit includes a d.c. power source 38 applying variable output voltage $V_{ref3}$, an operational amplifier 36 receiving the output voltage $V_{ref3}$ from the d.c. power source 38 on its non-inverting input terminal and receiving outputs from current mirror circuits K2, K1 consisting of the transistors Q9, Q10 and Q11, Q12 on its inverting input terminal, and a feedback resistance 37 having its first terminal connected to an output terminal of the operational amplifier 36 and its second terminal connected to the inverting input terminal of the operational amplifier 36; and like reference numerals denote remaining components equivalent or corresponding to those shown in FIG. 1. As to an operation of the full wave rectifying circuit in the third preferred embodiment, it is the same as that illustrated in FIG. 1 till the stage where the first and second current mirror circuits K1, K2 produce outputs, and subsequently, output currents from the first and second current mirror circuits K1, K2 are current-voltage converted by the operational amplifier 36 and the feedback resistance 37 so that full wave rectified voltage which is obtained by synthesizing outputs half wave rectified by the first and second differential gain stages can be produced with a reference of arbitrary voltage $V_{ref3}$. FIG. 7 is a waveform diagram illustrating an operation waveform at each junction of the full wave rectifying circuit shown in FIG. 6. FIG. 7(a) depicts a waveform at a junction A which receives a signal from the a.c. signal source 1 via a capacitor 3. FIGS. 7(b) and 7(c) depict waveforms of output currents $I_{O11}$, $I_{O12}$ from the first and second current mirror circuits K1, K2, respectively. Waveforms of components of the full wave rectifying circuit as shown in FIGS. 7(a) to 7(c) are identical to the waveforms of the components of the full wave rectifying circuit shown in FIG. 1. FIG. 7(d) depicts a waveform of output voltage $V_{OUT3}$. A magnitude of the voltage $V_{OUT3}$ output from the full wave rectifying circuit is determined depending upon values of the output currents $I_{O11}$, $I_{O12}$ from the first and second current mirror circuits K1, K2 and a resistance value of the feedback resistance 37.

Figure 8:
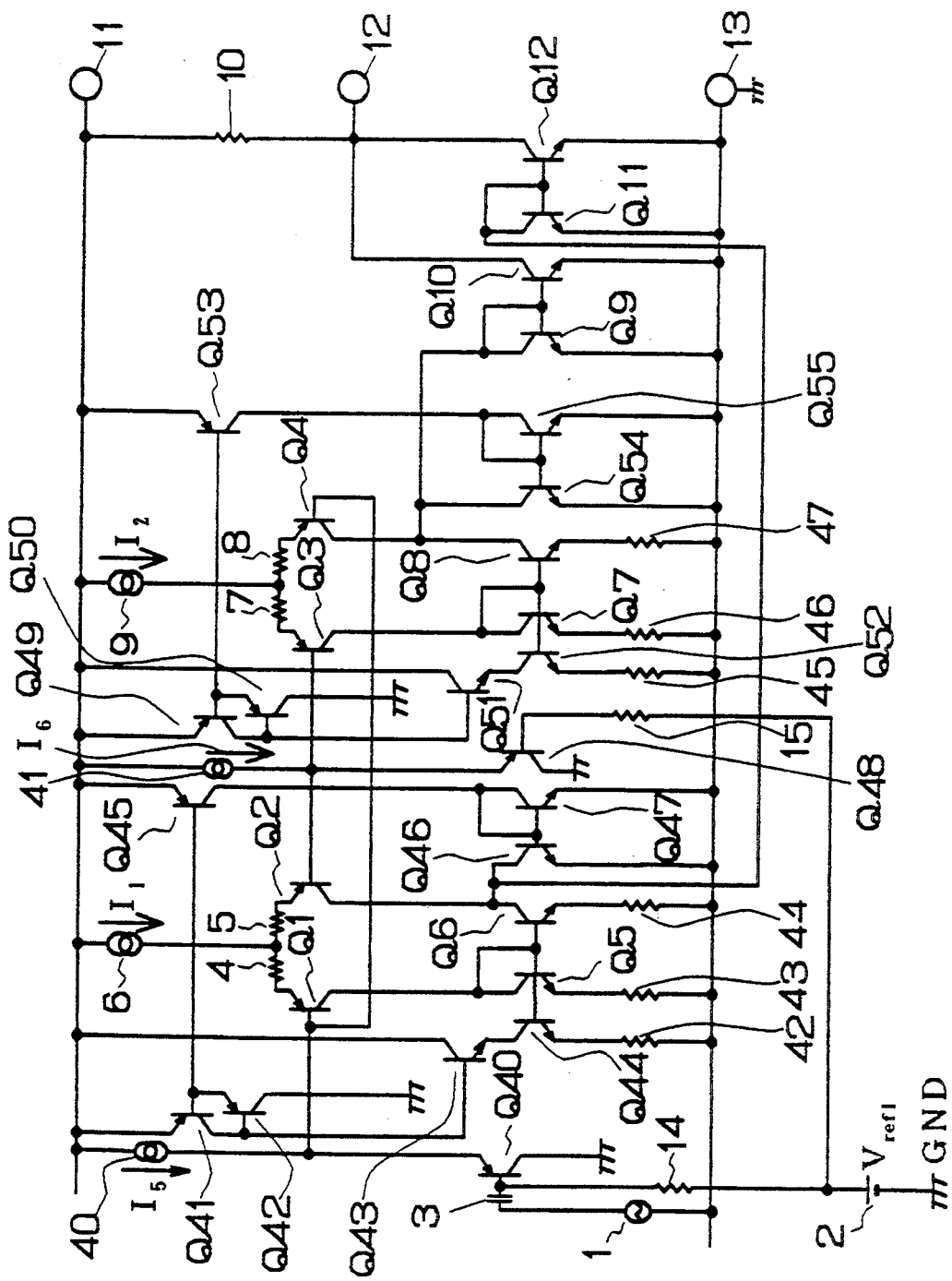
FIG. 8 is a circuit diagram showing a structure of a full wave rectifying circuit of a fourth preferred embodiment according to the present invention.
Figure 11:
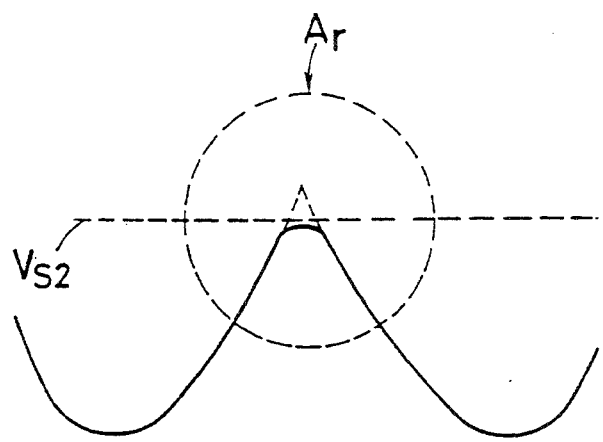
FIG. 11 is an enlarged diagram of a waveform of output voltage of the full wave rectifying circuit shown in FIG. 10(g)
Figure 12:
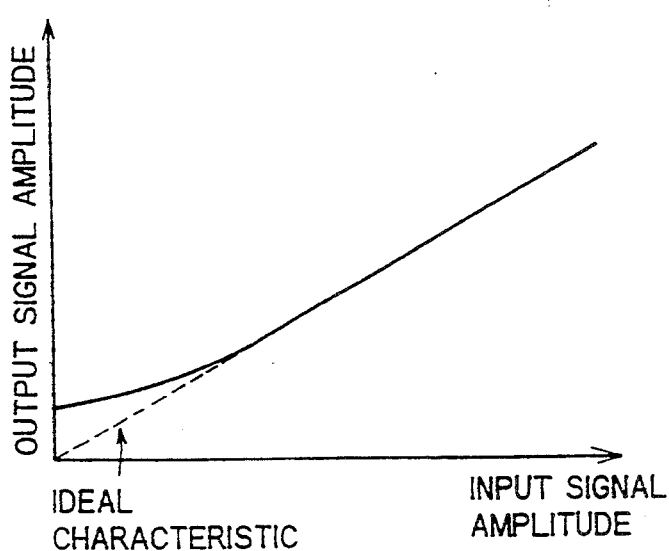
FIG. 12 is a diagram illustrating an input/output characteristic of the prior art full wave rectifying circuit shown in FIG. 9.

A full wave rectifying circuit of a fourth preferred embodiment of the present invention will be described in conjunction with FIG. 8. In FIG. 8, the full wave rectifying circuit includes transistors Q40, Q48 having their respective emitters connected to bases of transistors Q1 to Q4, or inputs of first and second differential gain stages, to relieve influence of base currents of the transistors Q1 to Q4, and constant current sources 40, 41 supplying currents $I_5$, $I_6$ to collectors of the transistors Q40, Q48. Transistors Q41 through Q47 and a resistance 42 constitute a circuit for relieving base currents of transistors Q5, Q6 of a first differential gain stage. Then, this circuit is arranged to subtract the sum of base currents flowing in the transistors Q5, Q6 and Q44 from output current of the first differential gain stage. A circuit consisting of transistors Q50 through Q55 and a resistance 45 is operative to a second differential gain stage similar to the above-mentioned circuit. Like reference numerals denote components equivalent or corresponding to those shown in FIG. 1. The full wave rectifying circuit shown in FIG. 8 is different from that shown in FIG. 1 in that an output signal from the a.c. signal source 1 is applied via the transistors Q40 and Q48 to the first and second differential gain stages. In the full wave rectifying circuit of the first preferred embodiment shown in FIG. 1, base currents of the transistors Q1, Q2 and Q3, Q4 of the first and second differential gain stages S1 and S2 affect voltages $V_A$ and $V_B$ at junctions A and B to vary those voltages, and such variations in the voltages cause the output current $I_{O11}$, $I_{O12}$ from the first and second current mirror circuits k1, K2 to vary. Then, the transistors Q40, Q48 are utilized to make currents flowing in resistances 14, 15 small so as to reduce variations in the voltages $V_A$, $V_B$ at the junctions A and B caused by the base currents.

In addition to that, the full wave rectifying circuit shown in FIG. 8 is different from the full wave rectifying circuit shown in FIG. 1 in that a circuit consisting of transistors Q41 to Q47 and a resistance 42 is added to the first differential rectifying circuit and a circuit consisting of transistors Q49 to Q55 and a resistance 45 is added to the second differential gain stage. In the full wave rectifying circuit according to the first preferred embodiment shown in FIG. 1, influence of the base current of the transistor Q5, Q6 of the first differential gain stage S1 causes currents flowing into the transistors Q5, Q6 to vary in magnitude, and this causes the error in the waveform of the output from the full wave rectifying circuit compared with the waveform of the a.c. signal input thereto. Then, in the full wave rectifying circuit in FIG. 8, the circuit consisting of the transistors Q41 to Q47 and the resistance 42 is utilized for compensation to pull currents identical in magnitude to the base currents flowing into the transistors Q5 from the current output to the first current mirror circuit, so that no error is caused in the output of the full wave rectifying circuit. It is also the same about the relation between the second differential gain stage and the circuit consisting of the transistors Q49 to Q55 and the resistance 45.

The full wave rectifying circuit shown in FIG. 1 is different from the full wave rectifying circuit shown in FIG. 8 because the former includes the resistances 43, 44, 46 and 47 in the first and second differential gain stages. These are all resistances for regulating currents flowing in the transistors Q5 to Q8. In the full wave rectifying circuit shown in FIG. 1, the quantity of the current flowing in each of the transistors Q5 through Q8 is determined depending upon the base-emitter voltages of the transistors Q5 through Q8; however, with the resistances 43, 44, 46 and 47 grounding emitters of the transistors Q5 through Q8, respectively, the quantity of each current is determined depending upon the sum of the base-emitter voltage of each of the transistors Q5 through Q8 and the voltage drop caused by the resistance.

While the invention has been shown and described in detail, the foregoing description is in all aspects illustrative and not restrictive. It is therefore understood that numerous modifications and variations can be devised without departing the scope of the invention.

I claim:

1. A full wave rectifying circuit comprising:

signal applying means having a first output terminal for applying d.c. bias voltage and a second output terminal for allying an a.c. signal with a reference of the d.c. bias voltage;

a first differential gain stage having a positive phase input terminal connected to said first output terminal of said signal applying means, a negative phase input terminal connected to said second output terminal of said signal applying means, and an output terminal, for rectifying said a.c. signal on the half wave basis to output it from said output terminal;

a second differential gain stage having a negative phase input terminal connected to said first output terminal of said signal applying means, a positive phase input terminal connected to said second output terminal of said signal applying means, and an output terminal, for rectifying said a.c. signal on the half wave basis to output it from said output terminal; and an output circuit connected to said output terminals of said first and second differential gain stages for synthesizing output from said first and second differential gain stages;

wherein said first differential gain stage includes a first differential element having a power terminal connected to a first d.c. current source for supplying specified current, a first voltage input terminal for receiving said d.c. bias voltage from said positive phase input terminal of said first differential gain stage, a second voltage input terminal for receiving said a.c. signal from said negative phase input terminal of said first differential gain stage, and first and second current output terminals for outputting the specified current received from said power terminal, said specified current being branched depending upon a potential difference between said first and second voltage input terminals so as to output them from said first and second current output terminals, and a first active load having first and second current input terminals connected to said first and second current output terminals of said first differential element, and a current output terminal for outputting output current produced in accordance with a difference between currents received from said first and second current input terminals of said first active load, and wherein said second differential gain stage includes a second differential element having a power terminal connected to a second d.c. current source for supplying specified current, a first voltage input terminal for receiving said d.c. bias voltage from said positive phase input terminal of said second differential gain stage, a second voltage input terminal for receiving said a.c. signal from said negative phase input terminal of said second differential gain stage, and first and second current output terminals for outputting the specified current received from said power terminal of said second differential element, said specified current being branched depending upon a potential difference between said first and second voltage input terminals of said second differential element so as to output them from said first and second current output terminals of said second differential element, and a second active load having first and second current input terminals connected to said first and second current output terminals of said second differential element, and a current output terminal for outputting output current produced in accordance with a difference between currents received from said first and second current input terminals of said second active load.

2. A full wave rectifying circuit according to claim 1, wherein said first differential element includes a first transistor having its control electrode connected to said first voltage input terminal of said first differential element and its first electrode connected to said first current output terminal of said first differential element, a second transistor having its control electrode connected to said second voltage input terminal of said first differential element and its first electrode connected to said first current output terminal of said first differential element, a first resistance having its first terminal connected to a second electrode of said first transistor and its second terminal connected to said power terminal of said first differential element, and a second resistance having its first terminal connected to a second electrode of said second transistor and its second terminal connected to said power terminal of said first differential element, and wherein said second differential element includes a third transistor having its control electrode connected to said first voltage input terminal of said second differential element and its first electrode connected to said first current output terminal of said second differential element, a fourth transistor having its control electrode connected to said second voltage input terminal of said second differential element and its first electrode connected to said first current output terminal of said second differential element, a third resistance having its first terminal connected to a second electrode of said third transistor and its second terminal connected to said power terminal of said second differential element, and;

a fourth resistance having its first terminal connected to a second electrode of said fourth transistor and its second terminal connected to said power terminal of said second differential element.

3. A full wave rectifying circuit according to claim 2, wherein
said first active load includes
a fifth transistor having its first electrode and control electrode connected to said first current input terminal of said first active load and its second electrode connected to a reference potential, and
a sixth transistor having its first electrode connected to said second current input terminal of said first active load, its control electrode connected to the control electrode of said fifth transistor, and its second electrode connected to said reference potential, and wherein
said second active load includes
a seventh transistor having its first electrode and control electrode connected to said first current input terminal of said second active load and its second electrode connected to a reference potential, and
a eighth transistor having its first electrode connected to said second current input terminal of said second active load, its control electrode connected to the control electrode of said second transistor, and its second electrode connected to said reference potential.

4. A full wave rectifying circuit, comprising:
signal applying means having a first output terminal for applying d.c. bias voltage and a second output terminal for allying an a.c. signal with a reference of the d.c. bias voltage;
a first differential gain stage having a positive phase input terminal connected to said first output terminal of said signal applying means, a negative phase input terminal connected to said second output terminal of said signal applying means, and an output terminal, for rectifying said a.c. signal on the half wave basis to output it from said output terminal;
a second differential gain stage having a negative phase input terminal connected to said first output terminal of said signal applying means, a positive phase input terminal connected to said second output terminal of said signal applying means, and an output terminal, for rectifying said a.c. signal on the half wave basis to output it from said output terminal; and
an output circuit connected to said output terminals of said first and second differential gain stages for synthesizing output from said first and second differential gain stages:
wherein said output circuit includes
a first current mirror circuit having an input terminal connected to said output terminal of said first differential gain stage and an output terminal,
a second circuit mirror circuit having an input terminal connected to said output terminal of said second differential gain stage and an output terminal, and
current-voltage converting means connected to said output terminals of said first and second mirror circuits for converting currents received from said first and second current mirror circuits into voltage to output it.

5. A full wave rectifying circuit according to claim 4, wherein
said first current mirror circuit includes
a first transistor having its first electrode and control electrode connected to said input terminal of said first current mirror circuit and its second electrode connected to a reference potential, and
a second transistor having its control electrode connected to said control electrode of said first transistor and its second electrode connected to said reference potential, and wherein
said second current mirror circuit includes
a third transistor having its first electrode and control electrode connected to said input terminal of said second current mirror circuit and its second electrode connected to said reference potential, and
a fourth transistor having its control electrode to the control electrode of said third transistor and its second electrode to said reference potential.

6. A full wave rectifying circuit according to claim 5, wherein said current-voltage converting means includes voltage dropping means having its first terminal connected to said output terminals of said first and second current mirror circuits and its second terminal connected to a first potential different from said reference potential.

7. A full wave rectifying circuit according to claim 4, wherein
said current-voltage converting means includes
an operational amplifier having an inverting input terminal connected to said output terminals of said first and second current mirror circuits, a non-inverting input terminal, and an output terminal,
a reference voltage source having its first electrode connected to said non-inverting input terminal of said operational amplifier and its second electrode connected to said reference potential, and
voltage dropping means having its first terminal connected to said output terminal of said operational amplifier and its second terminal connected to said inverting input terminal of said operational amplifier.

8. A full wave rectifying circuit according to claim 7, wherein said reference voltage source includes output voltage variable reference voltage source capable of varying voltage applied between said first and second electrodes provided in itself.

9. A full wave rectifying circuit according to claim 8, wherein said voltage dropping means includes a resistance having its first terminal connected to said output terminal of said operational amplifier and its second terminal connected to said inverting input terminal of said operational amplifier.

10. A full wave rectifying circuit, comprising:
signal applying means having a first output terminal for applying d.c. bias voltage and a second output terminal for allying an a.c. signal with a reference of the d.c. bias voltage;
a first differential gain stage having a positive phase input terminal connected to said first output terminal of said signal applying means, a negative phase input terminal connected to said second output terminal of said signal applying means, and an output terminal, for rectifying said a.c. signal on the half wave basis to output it from said output terminal;
a second differential gain stage having a negative phase input terminal connected to said first output terminal of said signal applying means, a positive phase input terminal connected to said second output terminal of said signal applying means, and an output terminal, for rectifying said a.c. signal on the half wave basis to output it from said output terminal; and an output circuit connected to said output terminals of said first and second differential gain stages for synthesizing output from said first and second differential gain stages wherein said signal applying means includes a first buffer circuit for buffering said d.c. bias voltage to output it from said first output terminal, and a second buffer circuit for buffering said a.c. signal with a reference of said d.c. bias voltage to output it from said second output terminal; and wherein said signal applying means further includes a constant voltage source having its first electrode connected to a reference potential, and first voltage dropping means having its first terminal connected to a second electrode of said constant voltage source and its second terminal connected to said first buffer circuit.

11. A full wave rectifying circuit according to claim 10, wherein said first buffer circuit includes a first transistor having its control electrode connected to the second terminal of said first voltage dropping means, its first electrode connected to said reference potential, and its second electrode connected to said first output terminal of said first buffer circuit, for receiving specified current on the second electrode.

12. A full wave rectifying circuit according to claim 10, wherein said signal applying means further includes an a.c. signal input terminal for receiving said a.c. signal, a capacitor having its first terminal connected to said a.c. signal input terminal, and second voltage dropping means having its first terminal connected to the second electrode of said constant voltage source and its second terminal connected to a second terminal of said capacitor and said second buffer circuit.

13. A full wave rectifying circuit according to claim 12, wherein said second buffer circuit includes a second transistor having its control electrode connected to the second terminal of said second voltage dropping means, its first electrode connected to said reference potential, and its second electrode connected to said second output terminal of said second buffer circuit, for receiving specified current on the second electrode.

* * * * *